(12) United States Patent
Wang

(10) Patent No.: US 10,415,748 B2
(45) Date of Patent: Sep. 17, 2019

(54) PORTABLE SELFIE STICK

(71) Applicant: SHENZHEN ASOKA PRINTING CO., LTD., Shenzhen, Guangdong (CN)

(72) Inventor: Yuancheng Wang, Guangdong (CN)

(73) Assignee: SHENZHEN ASOKA PRINTING CO., LTD., Shenzhen (CN)

( * ) Notice: Subject to any disclaimer, the term of this patent is extended or adjusted under 35 U.S.C. 154(b) by 0 days.

(21) Appl. No.: 16/083,571

(22) PCT Filed: Mar. 9, 2016

(86) PCT No.: PCT/CN2016/075957
§ 371 (c)(1),
(2) Date: Sep. 10, 2018

(87) PCT Pub. No.: WO2017/152391
PCT Pub. Date: Sep. 14, 2017

(65) Prior Publication Data
US 2019/0072233 A1 Mar. 7, 2019

(51) Int. Cl.
*F16M 13/04* (2006.01)
*G03B 15/04* (2006.01)
(Continued)

(52) U.S. Cl.
CPC ............ *F16M 13/04* (2013.01); *F16M 11/04* (2013.01); *F16M 11/28* (2013.01); *F16M 13/00* (2013.01);
(Continued)

(58) Field of Classification Search
None
See application file for complete search history.

(56) References Cited

U.S. PATENT DOCUMENTS 9,785,204 B1* 10/2017 Miller ................... G06F 1/1626
2012/0013790 A1* 1/2012 Chu ...................... G03B 17/561
348/372
(Continued)

FOREIGN PATENT DOCUMENTS

CN 204852863 U 12/2012
CN 204258874 U 4/2015
(Continued)

OTHER PUBLICATIONS

International Search Report of PCT Patent Application No. PCT/CN2016/075957 dated Nov. 17, 2016.

*Primary Examiner* — William B Perkey

(57) ABSTRACT

A portable selfie stick, including a multi-stage telescopic rod (1), and a bracket assembly (2) and a handle (3) respectively arranged at a head end and a tail end of the multi-stage telescopic rod. The portable selfie stick further includes a wireless charging device (4), the wireless charging device (4) includes a wireless charging coil (41) and an electromagnetic power converter arranged at the bracket assembly (2), a power line arranged in the multi-stage telescopic rod (1) in a penetrating manner, and a mobile power source (42) arranged in the handle (3); both ends of the power line are in electric connected with the mobile power source (42) and the electromagnetic power converter, respectively; and the electromagnetic power converter is electrically connected with the wireless charging coil (41).

13 Claims, 2 Drawing Sheets

(51) Int. Cl.

| | | |
|---|---|---|
| *G03B 17/56* | (2006.01) | |
| *F16M 11/04* | (2006.01) | |
| *F16M 11/28* | (2006.01) | |
| *F16M 13/00* | (2006.01) | |
| *H02J 7/02* | (2016.01) | |
| *H04M 1/12* | (2006.01) | |
| *H04M 1/04* | (2006.01) | |

(52) U.S. Cl.
CPC ......... *G03B 15/041* (2013.01); *G03B 17/563* (2013.01); *H02J 7/025* (2013.01); *H04M 1/04* (2013.01); *H04M 1/12* (2013.01)

(56) References Cited

U.S. PATENT DOCUMENTS

| | | | | |
|---|---|---|---|---|
| 2015/0076297 A1* | 3/2015 | Parrill | ............... | F16M 11/041 248/176.3 |
| 2015/0362828 A1* | 12/2015 | Patel | ............... | G03B 17/48 348/75 |
| 2016/0036478 A1* | 2/2016 | Wong | ............... | H02J 7/0044 455/573 |
| 2016/0062404 A1* | 3/2016 | Hur | ............... | G06F 1/1632 361/679.26 |
| 2016/0261782 A1* | 9/2016 | Li | ............... | H04N 5/232 |
| 2017/0064176 A1* | 3/2017 | Kim | ............... | F16M 11/18 |
| 2017/0212412 A1* | 7/2017 | Balmer | ............... | G03B 17/563 |
| 2017/0366746 A1* | 12/2017 | Yu | ............... | H04N 5/23222 |
| 2018/0259123 A1* | 9/2018 | Shim | ............... | F16M 13/04 |
| 2018/0313374 A1* | 11/2018 | Zeng | ............... | H04M 1/04 |
| 2019/0072233 A1* | 3/2019 | Wang | ............... | F16M 13/04 |

FOREIGN PATENT DOCUMENTS

| | | |
|---|---|---|
| CN | 204611288 U | 9/2015 |
| CN | 204669449 U | 9/2015 |
| CN | 204887105 U | 12/2015 |
| CN | 205038429 U | 2/2016 |

\* cited by examiner

PORTABLE SELFIE STICK

TECHNICAL FIELD

The present application relates to the technical field of auxiliary means for photographing, and more particularly relates to a portable selfie stick.

BACKGROUND

At present, taking selfies is becoming popular. The traditional selfie taken manner, due to the limitation of a shooting distance, generally causes close-fitting effects in selfies, while the selfie stick makes taking the selfies more convenient, the selfie stick can extend a distance between the photographing device and the user, so that most of the body and the scenery behind the body can be photographed, moreover, the selfies can be taken at any time, without needing the help from others, this is particularly suitable for home travelers or separate travelers.

An existing selfie stick only has the function of assisting the photographing device (such as a smart phone, etc.) to take selfies. However the battery power of the photographing device is limited, when a user does outdoor activities, if the power of the photographing device is exhausted, the user generally charges the photographing device by a mobile power source, which means that the user has to carry an additional mobile power source, thereby causing inconvenience, and the user also has to remove the photographing device from the selfie stick to wiredly charge the photographing device, which affects the photographing experience of the user. In addition, when the user takes a selfie in a dark photographing environment, due to the front camera of the photographing device has poor photographing effect in the dark photographing environment, poorly effect of the selfie may be caused, thereby seriously affecting the user's experience. Moreover, when the existing selfie stick is cooperated with a photographing device for photographing, if the user needs to switch between the front and rear cameras of the photographing device, they usually need to directly touch the front and rear cameras of the photographing device to realize the operation of the switching, which is inconvenient, especially when the selfie stick is extended.

SUMMARY

To overcome the above-described prior-art defects, among others, an object of the present application is to provide a portable selfie stick, to enable wireless charging of a photographing device when the photographing device is clamped onto the bracket of the portable selfie stick, without additional power source being required, thereby the use convenience for the user is improved, and the user experience effect is enhanced.

An embodiment of the present application provides a portable selfie stick, comprising a multi-stage telescopic rod, and a bracket assembly and a handle respectively arranged at a head end and a tail end of the multi-stage telescopic rod, the portable selfie stick further comprises a wireless charging device for wirelessly charging the photographing device, the wireless charging device comprises a wireless charging coil and an electromagnetic power converter arranged at the bracket assembly, a power line arranged in the multi-stage telescopic rod in a penetrated manner, and a mobile power source arranged in the handle, both ends of the power line are respectively electrically connected to the mobile power source and the electromagnetic power converter, and the electromagnetic power converter is electrically connected to the wireless charging coil.

Further, a power switch for controlling charging is arranged at the handle, and the power switch is electrically connected between the power line and the mobile power source.

Further, the handle is further arranged with a switching button for switching a front camera and a rear camera of the photographing device, the switching button is electrically connected to the photographing device through a control line, and the control line is arranged in the multi-stage telescopic rod in a penetrated manner.

Further, the handle is further arranged with a photographing button for controlling photographing of the front camera and the rear camera of the photographing device, the photographing button is electrically connected with the photographing device through the control line.

Further, the bracket assembly comprises a main bracket body, a receiver that is arranged at one end of the main bracket body and is used for receiving the handle, and a support arranged at the other end of the main bracket body, one end of the receiver is rotatably connected with the head end of the multi-stage telescopic rod.

Further, the support is arranged with a front flashlight for assisting photographing of the front camera of the photographing device, the front flashlight is electrically connected with mobile power source through the power line.

Further, the support is arranged with a rear flashlight for assisting photographing of the rear camera of the photographing device, the rear flashlight is electrically connected with mobile power source through the power line.

Further, the receiver is arranged with a trough, the trough is used for receiving the handle and the multi-stage telescopic rod in a retraction state.

Further, the receiver comprises two U-shaped frames that are connected to the two sides of one end of the main bracket body, and a connection rod that is connected to the two U-shaped frames, the main bracket body and the two U-shaped frames and the connection rod are enclosed to form the trough.

Further, the bracket assembly is integrally formed as one piece.

Based on the technology scheme, the portable selfie stick provided by the embodiment of the present application, by arranging a wireless charging device between the bracket assembly, the multi-stage telescopic rod and the handle, specifically, a wireless charging coil and an electromagnetic power converter electrically connected with the wireless charging coil are arranged at the bracket assembly, and a mobile power source electrically connected with the electromagnetic power converter through a power line is arranged in the handle, so that when the photographing device is clamped on the bracket assembly, and turning on the mobile power source, so as to achieve wirelessly charging to the photographing device, in this way, the mobile power source does not need to be additionally carried, thereby the use convenience of the user is improved, and the user experience effect is further improved.

DETAILED DESCRIPTION OF THE EMBODIMENTS

In order to make the purpose, technical solutions, and beneficial effects of the present application clearer and more understandable, the present application will be further described in detail herein after with reference to the accompanying drawings and embodiments. It should be understood that the embodiments described herein are only intended to illustrate but not to limit the present application.

It is noted that when a component is referred to as being "fixed to" or "disposed on" another component, it can be directly or indirectly on the other component. When a component is referred to as being "connected to" another component, it can be directly or indirectly connected to the other component.

It is noted that, "left", "right", "upper" and "lower" and other terms indicating the orientation are only as a reference of mutual relative concept or at the normal use of the product state , and therefore it cannot be construed as limiting the present application.

Figure 1:
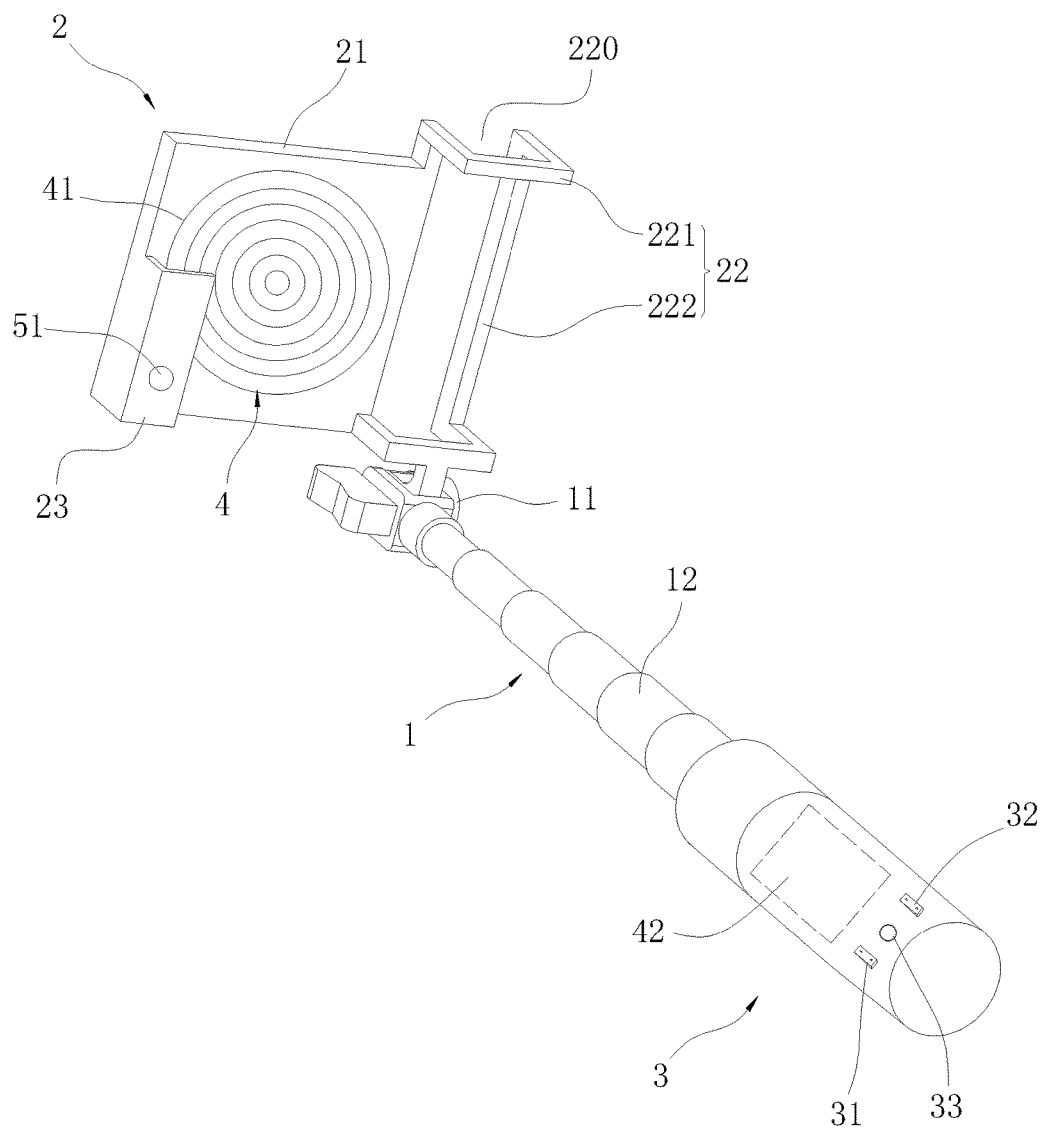
FIG. 1 is a schematic perspective view of a portable selfie stick according to an embodiment of the present application.
Figure 2:
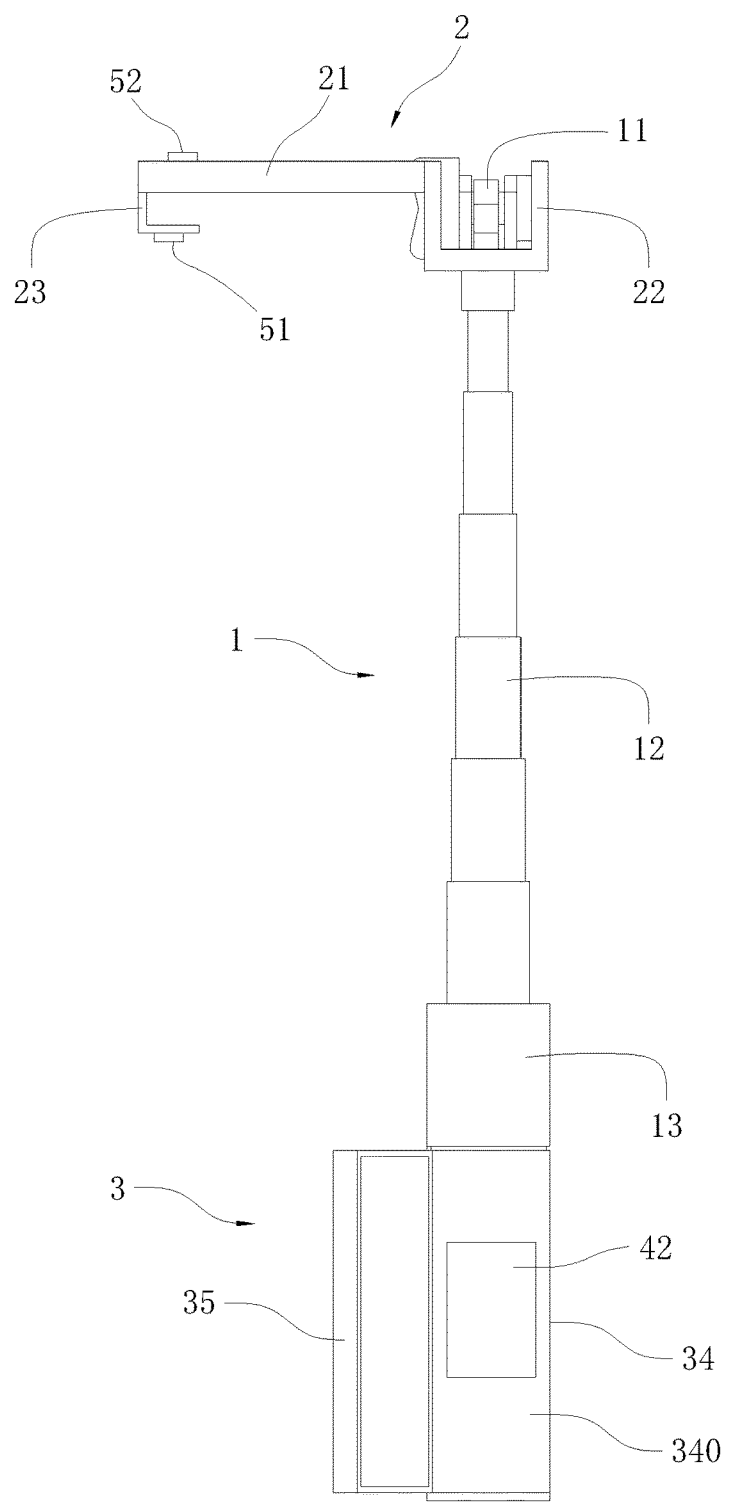
FIG. 2 is a top view of a portable selfie stick according to an embodiment of the present application.

As shown in FIGS. 1 and 2, the embodiment of the present application provides a portable selfie stick, the portable selfie stick comprises a multi-stage telescopic rod 1, a bracket assembly 2 and a handle 3, the bracket assembly 2 is used for installing and fixing a photographing device, the handle 3 is used for being held by a hand, the multi-stage telescopic rod 1 is extended or shortened to adjust an overall length of the selfie stick, herein the handle 3 is arranged at a tail end of the multi-stage telescopic rod 1, the bracket assembly 2 is arranged at a head end of the multi-stage telescopic rod 1, and the bracket assembly 2 is rotatably connected with the head end of the multi-stage telescopic rod 1, herein when the portable selfie stick is not used, by shortening the multi-stage telescopic rod 1 and rotating the multi-stage telescopic rod 1 relative to the bracket assembly 2, the multi-stage telescopic rod 1 and the handle 3 in the retraction state can be accommodated in the bracket assembly 2. In addition, the portable selfie stick further comprises a wireless charging device 4, the wireless charging device 4 is used for carrying out wireless charging to the photographing device. Specifically, the wireless charging device 4 comprises: a wireless charging coil 41, an electromagnetic power converter (not shown in the drawings), a power line (not shown in the drawings) and a mobile power source 42. The wireless charging coil 41 and the electromagnetic power converter are all arranged at the bracket assembly 2, herein the wireless charging coil 41 is specifically arranged at an inner side surface of the bracket assembly 2 and is electrically connected with the electromagnetic power converter, when the photographing device is clamped in the bracket assembly 2, the photographing device is just located on the side where the wireless charging coil 41 is arranged and is in wireless charging cooperation with the wireless charging coil 41; meanwhile, the mobile power source 42 is arranged in the handle 3, and the main body part of the power line is arranged in the multi-stage telescopic rod 1 in a penetrating manner, and the two ends of the power line are electrically connected with the mobile power source 42 and the electromagnetic power converter respectively.

The portable selfie stick provided by an embodiment of the present application has the following characteristics:

The portable selfie stick provided by the embodiment of the present application, a wireless charging device 4 is arranged in the bracket assembly 2, the multi-stage telescopic rod 1 and the handle 3. Specifically, the wireless charging coil 41 and the electromagnetic power converter electrically connected with the wireless charging coil 41 are arranged at the bracket assembly 2, and a mobile power source 42 electrically connected with the electromagnetic power converter through a power line is arranged in the handle 3, so that when the photographing device is clamped on the bracket assembly 2, and the mobile power source 42 is turned on, the wireless charging of the photographing device can be achieved, in this way, without additional the mobile power source 42 being required, thereby the use convenience of the user is improved, and the user experience effect is further improved.

Further, in an embodiment of the present application, a power switch 31 for controlling wireless charging is arranged at the handle 3, and the power switch 31 is electrically connected between the power line and the mobile power source 42. That is, when the photographing device clamped in the bracket assembly 2 needs to be wireless charged, by turning on the power switch 31, the wireless charging of the photographing device can be realized.

Further, in an embodiment of the present application, the handle 3 is further provided with a switching button 32, the switching button 32 is used for switching between a front camera and a rear camera of the photographing device, the switching button 32 is electrically connected to the photographing device through a control line (not shown in the drawings), and the control line is arranged in the multi-stage telescopic rod 1 in a penetrating manner. That is, when the photographing device is clamped in the bracket assembly 2 and needs to be switched between the front camera and the rear camera, it is only required to open a photographing APP of the photographing device, and press the switching button 32 to switch. The method is rapid and convenient, and the complicate setting on the photographing device is effectively avoided, thus improving the user experience. It can be understood that, according to actual conditions and specific requirements, in other embodiments of the present application, the switch button 32 can be a single button, and can also be two buttons that are configured to control the front camera and the rear camera, respectively.

Further, in an embodiment of the present application, the handle 3 is further provided with a photographing button 33, the photographing button 33 is used for controlling photographing of the front camera and the rear camera of the photographing device, the photographing button 33 is electrically connected with the photographing device through the control line. In other words, when the front camera or the rear camera is switched via the switching button 32, the photographing button 33 is pressed to photograph. It can be understood that, according to actual conditions and specific requirements, in other embodiments of the present application, the photographing can also be directly conducted via multiple times of pressing or long pressing of the switching button 32, in other words, the photographing button 33 does not need to be additionally arranged, which are not uniquely limited herein.

Further, in an embodiment of the present application, the bracket assembly 2 comprises a main bracket body 21, a receiver 22 and a support 23, the support 23 and the receiver 22 are respectively connected to a left end and a right end of the main bracket body 21, the support 23 is used for loading accessory parts (such as a flash lamp and so on), the receiver 22 is used for accommodating the handle and the multi-stage telescopic rod in a retraction state, the wireless charging coil 41 is arranged at the inner side surface of the main bracket body 21, herein the lower end of the receiver 22 is rotatably connected with the head end of the multi-stage telescopic rod 1. In the embodiment, the main bracket body 21 is preferably a plate-like member, certainly, according to actual conditions and specific requirements, in other embodiments of the present application, the main bracket body 21 can also be of other shape structures; in addition, the bracket assembly 2 can also be in the form of other structures, which are not uniquely limited herein.

Further, in an embodiment of the present application, a front flashlight 51 is arranged at a position at front side of the support 23, the front flashlight 51 is used for assisting photographing of the front camera of the photographing device, herein the front flashlight 51 is electrically connected with the mobile power source 42 via the power line. When the user needs to take selfies, the front flashlight 51 can be turned on for lighting selfie objects (such as themselves), in this way, the user can freely take selfies under the condition of relatively dark ambient light, thus solving the problem of limitation of ambient light when taking selfies, and effectively improving the user experience effect. It can be understood that, according to actual conditions and specific requirements, in other embodiments of the present application, the photographing effect can be improved via other auxiliary manners.

Further, in an embodiment of the present application, a rear flashlight 52 is arranged at a position on the rear side of the support 23, the rear flashlight 52 is used for assisting photographing of the rear camera of the photographing device, herein the rear flashlight 52 is electrically connected with the mobile power source 42 through the power line. When the user needs to use the rear camera of the photographing device to conduct scenery photographing, they can turn on the rear flashlight 52 for lighting the scenery of photographing in the front, in this way, the user can freely take selfies under the condition of relatively dark ambient light, thus solving the problem of limitation of ambient light when conducting scenery photographing, and effectively improving the user experience effect. It can be understood that, according to actual conditions and specific requirements, in other embodiments of the present application, and the photographing effect can be improved via other auxiliary manners, which are not uniquely limited herein.

Further, in an embodiment of the present application, the receiver 22 is provided with a trough 220, the trough 220 is used for accommodating the handle 3 and the multi-stage telescopic rod 1 in the retraction state. Thus, by arranging the trough 220 on the receiver 22, an overall size of the portable selfie stick in the contain state can be minimized, and more convenient to for the user to carry the portable selfie stick.

Further, in an embodiment of the present application, the receiver 22 comprises two U-shaped frames 221 and a connection rod 222, in which, the two U-shaped frames 221 are connected to two sides of one end of the main bracket body 221, and the two U-shaped frames 221 are oppositely arranged, the connection rod 222 is located on an outer side of the right end of the main bracket body 21, and two ends of the connection rod 222 are respectively connected with the two U-shaped frames 221, in this way, the main bracket body 21, the two U-shaped frames 221 and the connection rod 222 are enclosed to form the trough 220. It can be understood that, according to actual conditions and specific requirements, in other embodiments of the present application, the receiver 22 can also be of other forms of structures, which are not uniquely limited herein.

Further, in an embodiment of the present application, the bracket assembly 2 is integrally formed as one piece. In other words, the integrated parties integrally formed via the main bracket body 21. Thus, the structure is simple and easy to be producted and manufactured. It can be understood that, according to actual conditions and specific requirements, in other embodiments of the present application, the bracket assembly 2 can also be formed by connecting a plurality of independent structural members, for example, the main bracket body 21, the receiver 22 and the support 23 are independent parts which are independent from each other, and the three parts are connected into a whole.

Further, in an embodiment of the present application, the multi-stage telescopic rod 1 can comprise an adapter seat 11, a multi-stage telescopic joint rod 12 and a receiving seat 13, in which the adapter seat 11 and the receiving seat 13 are respectively connected to the head end and the tail end of the multi-stage telescopic joint rod 12, and the adapter seat 11, the multi-stage telescopic joint rod 12 and the receiving seat 13 are coaxially arranged. The adapter seat 11 is also rotatably connected with one end of the receiver 22, specifically, the adapter seat 11 is rotatably connected with the U-shaped frame 221 at the lower end of the receiver 22. In addition, the receiving seat 13 is further connected with the head end of the handle 3, the receiving seat 13 is used for accommodating the multi-stage telescopic rod 1, which means when the multi-stage telescopic joint rod 1 is accommodated, the multi-stage telescopic joint rod 1 is accommodated in the receiving seat 13. It can be understood that, according to actual conditions and specific requirements, in other embodiments of the present application, the multi-stage telescopic joint rod 1 can also be of other forms of structures, which are not uniquely limited herein.

Further, in an embodiment of the present application, the handle 3 can comprise a handle bracket 34 and a flip cover 35, preferably, the handle bracket 34 and the flip cover 35 are both semi-cylindrical hollow shells; and the flip cover 35 is in rotatable connection with the handle bracket 34, preferably, the flip cover 35 is in hinge connection with the handle bracket 34, and other forms of rotatable connection can also be adopted. When the flip cover 35 is buckled with the handle bracket 34, the flip cover 35 and the handle bracket 34 form a cylindrical hollow shell. In addition, the head end of the handle bracket 34 is connected with the receiving seat 13, so that the whole handle 3 is connected to the receiving seat 13, the handle bracket 34 is provided with a accommodation cavity 340 herein, the accommodation cavity 340 is used for accommodating the mobile power source 42. It can be understood that, according to actual conditions and specific requirements, in other embodiments of the present application, the handle 3 can also be in other structural forms such as a pull-out box type or other flip type, or the handle 3 is arranged in a whole for directly installing the mobile power source 42 therein and so on, which are not uniquely limited herein.

Based on the technical solution, due that the selfie stick may be used in many places such as traveling, residential and meeting at present, the use of the integrated selfie stick, which is capable of wireless charging the photographing device, switching between the front camera and the rear camera of the photographing device, and assisting the photographing via the front flashlight and the rear flashlight, not only solves the inconvenience of the user in using the selfie stick, but also effectively improves the user experience effect.

The aforementioned embodiments are only preferred embodiments of the present application, and are not intended to limit the present application. Any modification, equivalent replacement, improvement, and so on, which are made within the spirit and the principle of the present application, should be included in the scope of the present utility model. Therefore, the scope of the present application is subject to the scope of the claims.

What is claimed is:

1. A portable selfie stick, comprising a multi-stage telescopic rod, and a bracket assembly and a handle respectively arranged at a head end and a tail end of the multi-stage telescopic rod, wherein the portable selfie stick further comprises a wireless charging device for wirelessly charging the photographing device, the wireless charging device comprises a wireless charging coil and an electromagnetic power converter arranged at the bracket assembly, a power line arranged in the multi-stage telescopic rod in a penetrating manner, and a mobile power source arranged in the handle; the two ends of the power line are respectively electrically connected with the mobile power source and the electromagnetic power converter; and the electromagnetic power converter is electrically connected with the wireless charging coil.

2. The portable selfie stick of claim 1, wherein a power switch for controlling charging is arranged at the handle, and the power switch is electrically connected with and between the power line and the mobile power source.

3. The portable selfie stick of claim 2, wherein the handle is further provided with a switching button for switching between a front camera and a rear camera of the photographing device, the switching button is electrically connected with the photographing device via a control line, and the control line is arranged in the multi-stage telescopic rod in a penetrating manner.

4. The portable selfie stick of claim 3, wherein the handle is further provided with a photographing button for controlling photographing of the front camera and the rear camera of the photographing device, the photographing button is electrically connected with the photographing device via the control line.

5. The portable selfie stick of claim 4, wherein the bracket assembly comprises a main bracket body, a receiver that is arranged at one end of the main bracket body and is used for receiving the handle, and a support arranged at the other end of the main bracket body, and one end of the receiver is rotatabely connected with the head end of the multi-stage telescopic rod.

6. The portable selfie stick of claim 5, wherein the support is provided with a front flashlight for assisting photographing of the front camera of the photographing device, the front flashlight is electrically connected with mobile power source via the power line.

7. The portable selfie stick of claim 6, wherein the support is arranged with a rear flashlight for assisting photographing of the rear camera of the photographing device, the rear flashlight is electrically connected with mobile power source through the power line.

8. The portable selfie stick of claim 6, wherein the receiver is provided with a trough, the trough is used for accommodating the handle and the multi-stage telescopic rod in a retraction state.

9. The portable selfie stick of claim 8, wherein the receiver comprises two U-shaped frames in connection with two sides edges at one end of the main bracket body, and a connection rod that in connection with the two U-shaped frames; the main bracket body and the two U-shaped frames and the connection rod are enclosed to form the trough.

10. The portable selfie stick of claim 9, wherein the bracket assembly is integrally formed as one piece.

11. The portable selfie stick of claim 7, wherein the receiver is provided with a trough, the trough is used for accommodating the handle and the multi-stage telescopic rod in a retraction state.

12. The portable selfie stick of claim 11, wherein the receiver comprises two U-shaped frames in connection with two sides edges at one end of the main bracket body, and a connection rod that in connection with the two U-shaped frames; the main bracket body and the two U-shaped frames and the connection rod are enclosed to form the trough.

13. The portable selfie stick of claim 12, wherein the bracket assembly is integrally formed as one piece.

* * * * *